(12) United States Patent
Sugihara

(10) Patent No.: US 12,518,374 B2
(45) Date of Patent: Jan. 6, 2026

(54) DEFECT INSPECTION APPARATUS AND DEFECT INSPECTION METHOD

(71) Applicant: NuFlare Technology, Inc., Yokohama (JP)

(72) Inventor: Shinji Sugihara, Tokyo (JP)

(73) Assignee: NuFlare Technology, Inc., Yokohama (JP)

( * ) Notice: Subject to any disclaimer, the term of this patent is extended or adjusted under 35 U.S.C. 154(b) by 370 days.

(21) Appl. No.: 18/260,839

(22) PCT Filed: Oct. 5, 2021

(86) PCT No.: PCT/JP2021/036823
§ 371 (c)(1),
(2) Date: Jul. 10, 2023

(87) PCT Pub. No.: WO2022/172504
PCT Pub. Date: Aug. 18, 2022

(65) Prior Publication Data
US 2024/0054633 A1 Feb. 15, 2024

(30) Foreign Application Priority Data
Feb. 15, 2021 (JP) .................. 2021-021803

(51) Int. Cl.
*G06T 7/00* (2017.01)
(52) U.S. Cl.
CPC .... *G06T 7/001* (2013.01); *G06T 2207/10061* (2013.01)
(58) Field of Classification Search
CPC .......... G06T 7/001; G06T 2207/10061; G06T 2207/30148; G06T 7/13; G06T 7/11;
(Continued)

(56) References Cited

U.S. PATENT DOCUMENTS

| 5,475,766 A | 12/1995 | Tsuchiya et al. |
| 5,804,340 A | 9/1998 | Garza et al. |

(Continued)

FOREIGN PATENT DOCUMENTS

| JP | 60-113102 A | 6/1985 |
| JP | 5-197132 A | 8/1993 |
| JP | 7-243984 A | 9/1995 |
| JP | 11-143052 A | 5/1999 |
| JP | 2000-28334 A | 1/2000 |

(Continued)

OTHER PUBLICATIONS

English translation of International Preliminary Report on Patentability and Written Opinion issued Aug. 24, 2023 in PCT/JP2021/036823, 6 pages.

(Continued)

*Primary Examiner* — Samir A Ahmed
(74) *Attorney, Agent, or Firm* — Oblon, McClelland, Maier & Neustadt, L.L.P.

(57) ABSTRACT

A defect inspection apparatus includes an imaging mechanism for imaging a sample; an image acquisition circuit configured to generate an inspection image based on image data of the sample imaged by the imaging mechanism; a development circuit configured to generate a developed image from design data; a reference image generation circuit that includes a resizing process circuit configured to perform pattern classification from the developed image, and execute a resizing process for the developed image based on a resizing amount set for each classification, and that is configured to generate a reference image using the developed image after the resizing process; and a comparison circuit configured to compare the inspection image with the reference image.

8 Claims, 13 Drawing Sheets

(58) Field of Classification Search
CPC .... G01N 21/88; G01N 23/2251; H01L 22/00; G06V 10/40
See application file for complete search history.

(56) References Cited

U.S. PATENT DOCUMENTS

| | | | |
|---|---|---|---|
| 6,400,838 B2 | 6/2002 | Watanabe | |
| 7,602,961 B2* | 10/2009 | Yoshikawa | G03F 1/84 382/148 |
| 2001/0012390 A1* | 8/2001 | Watanabe | G06T 7/0006 382/144 |
| 2003/0061594 A1* | 3/2003 | Tsuchiya | G03F 1/26 702/82 |
| 2008/0130982 A1* | 6/2008 | Kitamura | G06V 10/471 382/144 |

FOREIGN PATENT DOCUMENTS

| | | |
|---|---|---|
| JP | 2000-106336 A | 4/2000 |
| JP | 2002-244275 A | 8/2002 |
| JP | 2007-40839 A | 2/2007 |
| JP | 2022-120623 A | 8/2022 |
| JP | 2023-30539 A | 3/2023 |

OTHER PUBLICATIONS

International Search Report issued Dec. 21, 2021 in PCT/JP2021/036823, filed on Oct. 5, 2021, 2 pages.
Taiwanese Office Action issued Oct. 17, 2022 in TW11121015770, 16 pages (with English Translation).
Office Action issued Nov. 7, 2023, in corresponding Japanese Patent Application No. 2021-021803 (with English Translation), 8 pages.

* cited by examiner

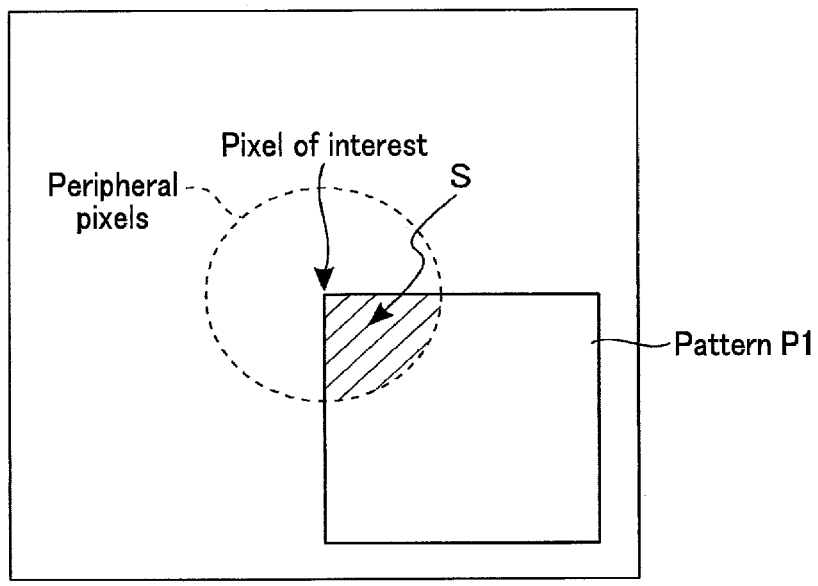
F I G. 5
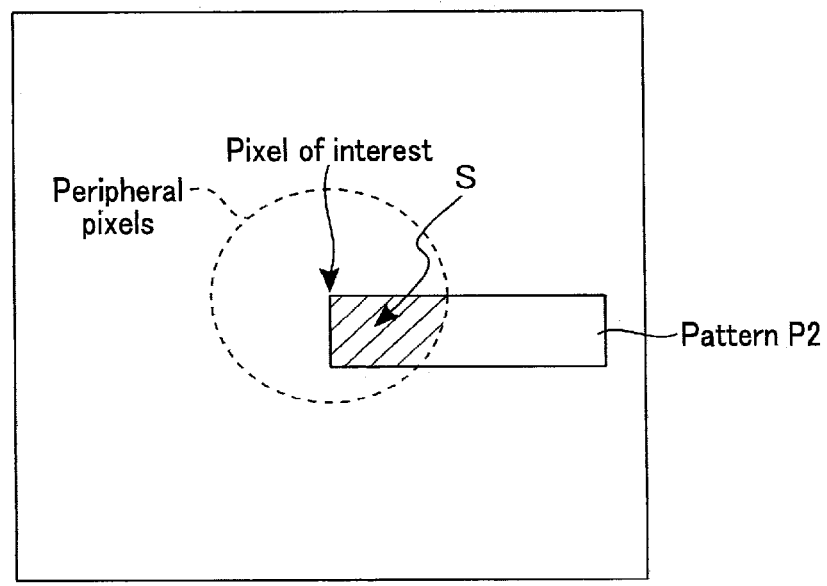
F I G. 6

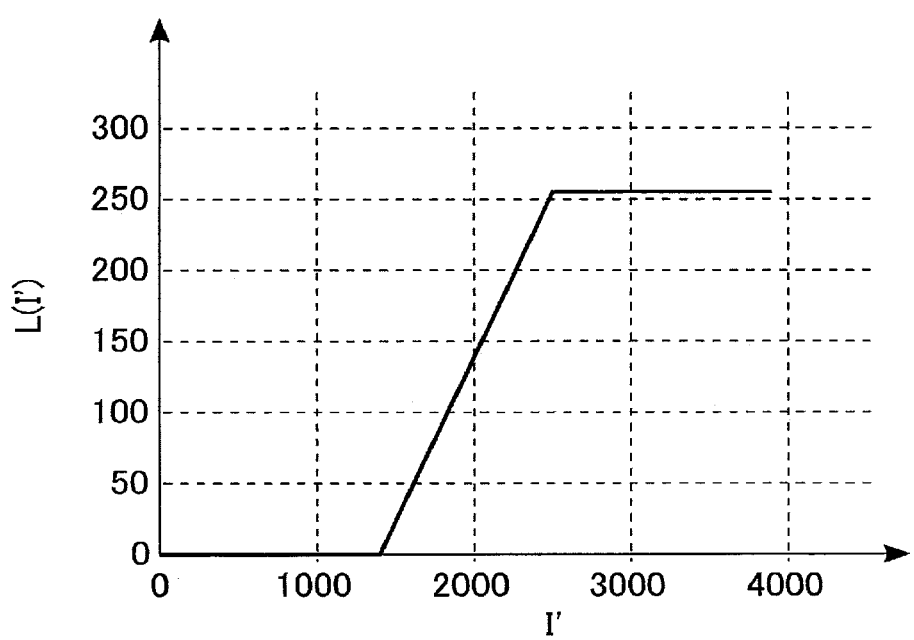
F I G. 12

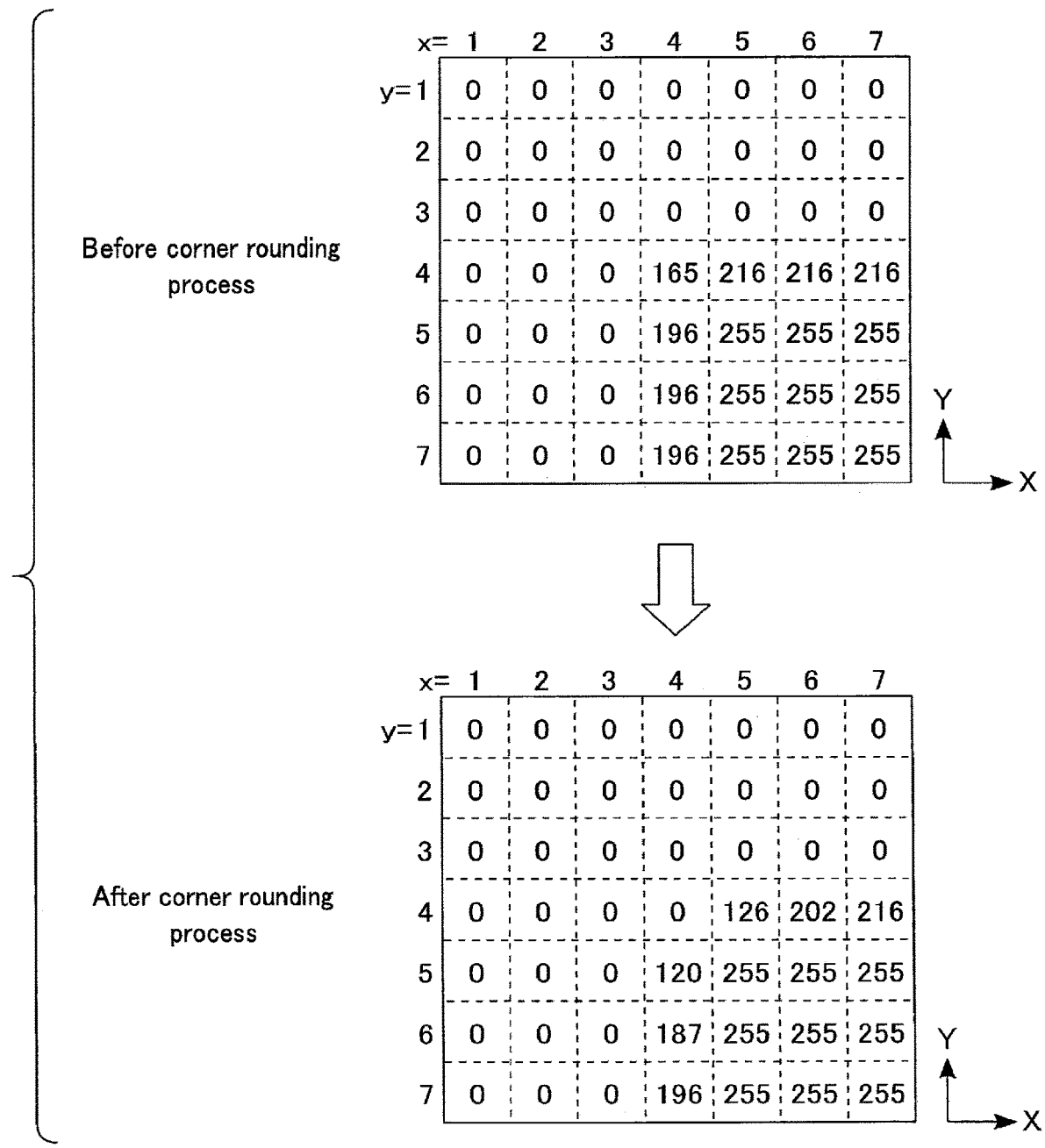
F I G. 13

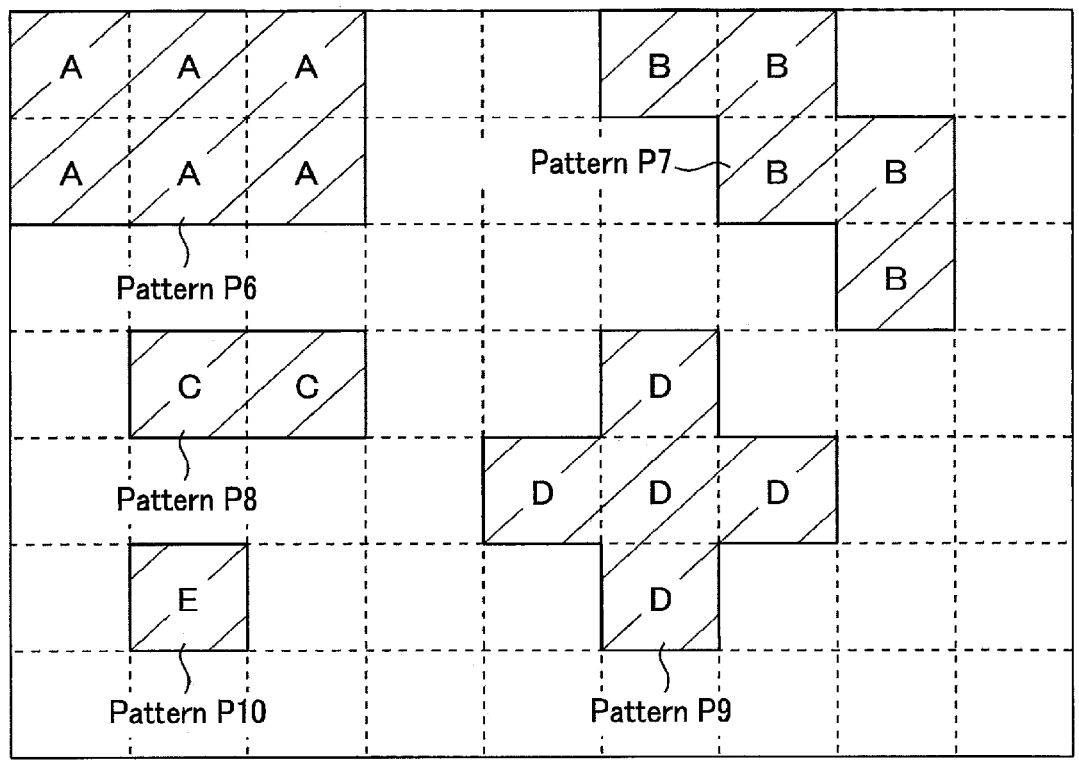
F I G. 16
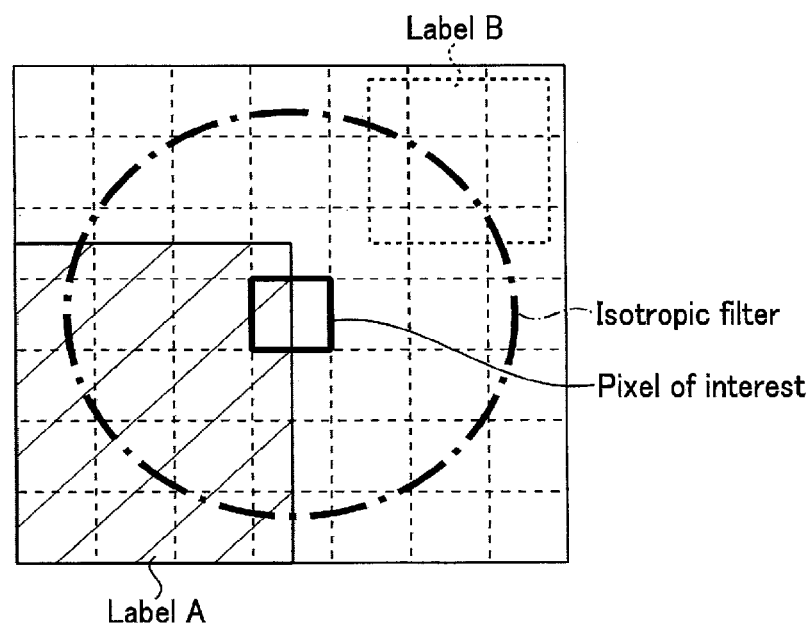
F I G. 17

DEFECT INSPECTION APPARATUS AND DEFECT INSPECTION METHOD

FIELD

Embodiments described herein relate generally to a defect inspection apparatus and a defect inspection method for inspecting a defect of a pattern formed on a sample.

BACKGROUND

The process of manufacturing a semiconductor device includes a step where an exposure apparatus (also referred to as a "stepper" or a "scanner") performs reduced exposure to transfer circuit patterns onto a semiconductor substrate. The exposure apparatus uses a mask (also referred to as a "reticle") with an original pattern (also referred to as a "mask pattern") for the transfer of a circuit pattern onto a semiconductor substrate (also referred to as a "wafer").

For example, state-of-the-art devices require formation of circuit patterns with line widths of a few nanometers. As the circuit patterns are miniaturized, original patterns in the mask are also miniaturized. Therefore, a mask defect inspection apparatus is required to have a high defect detection capability corresponding to miniaturized original patterns.

There are modes of defect inspection including a die-to-database (D-DB) mode in which an inspection image based on an image captured by a defect inspection apparatus is compared with a reference image based on design data, and a die-to-die (D-D) mode in which a plurality of regions of a mask having the same pattern formed on a mask are compared to one another.

The dimensions of a pattern formed on a mask may shift due to a pattern forming (drawing and etching) process. In the case of the D-DB mode, if the dimension shift occurs, the edge position of the pattern of the inspection image may not align with the reference image. If a misalignment occurs between the reference image and the inspection image, the misaligned portion is detected as a pseudo defect.

In order to cope with the dimension shift, when a reference image is created, corrections such as a resizing process of moving an edge position of the pattern and a corner rounding process of rounding a corner portion of the pattern are performed on a two valued or multi-valued developed image generated based on the design data.

For example, Patent Literature 1 discloses an inspection apparatus that performs a corner rounding process by determining the type, direction, and size of a corner.

CITATION LIST

Patent Literature

Patent Literature 1: Jpn. Pat. Appln. KOKAI Publication No. H11-143052

SUMMARY

Technical Problem

The degree of rounding of a corner of a pattern in an inspection image depends on the pattern and the shape of the corner. Therefore, when a uniform corner rounding amount is applied to the corners of various patterns, it is difficult to make the reference image and the inspection image coincide with respect to the corners of all patterns.

The present invention has been made in view of these points. Thus, an object of the present invention is to provide a defect inspection apparatus and a defect inspection method which can classify corners of patterns into classes and perform a corner rounding process based on the classes.

Solution to Problem

According to a first aspect of the present invention, a defect inspection apparatus includes an imaging mechanism for imaging a sample; an image acquisition circuit configured to generate an inspection image based on image data of the sample imaged by the imaging mechanism; a development circuit configured to generate a developed image from design data; a reference image generation circuit that includes a corner rounding process circuit configured to detect corners of a pattern from the developed image, classify the detected corners into classes, and execute a corner rounding process with corner rounding amounts respectively different for the classes, and that is configured to generate a reference image using the developed image after the corner rounding process; and a comparison circuit configured to compare the inspection image with the reference image.

According to the first aspect of the present invention, it is preferable that the corner rounding process circuit be configured to set a corner detection pixel and at least a pixel adjacent to the corner detection pixel as a class region corresponding to a class of the corner detection pixel based on the pattern and shapes of the corners.

According to the first aspect of the present invention, it is preferable that the corner rounding process circuit be configured to assign the corner rounding amount corresponding to the class of the corner detection pixel to the class region and create a corner rounding amount map.

According to the first aspect of the present invention, it is preferable that the corner rounding process circuit be configured to execute a filtering process using an isotropic filter having a size equal to or smaller than a preset value based on a first corner rounding amount assigned to a first class; calculate a difference between the first corner rounding amount and a second corner rounding amount assigned to a second class; and execute the filtering process based on the difference, using the isotropic filter having the size equal to or smaller than the preset value.

According to the first aspect of the present invention, it is preferable that the corner rounding process circuit be configured to apply a label to a pixel corresponding to each pattern in the developed image; and execute the corner rounding process for each label.

According to a second aspect of the present invention, a defect inspection method includes: imaging a sample to generate an inspection image; generating a developed image from design data; detecting corners of a pattern from the developed image; classifying the detected corners into classes; executing a corner rounding process with corner rounding amounts respectively different for the classified classes; generating a reference image based on the developed image after the corner rounding process; and comparing the inspection image with the reference image to perform inspection.

According to the second aspect of the present invention, it is preferable that the image processing method further include setting a corner detection pixel and at least a pixel adjacent to the corner detection pixel as a class region corresponding to a class of the corner detection pixel based on the pattern and shapes of the corners.

According to the second aspect of the present invention, it is preferable that the executing the corner rounding process include: assigning the corner rounding amount corresponding to the class of the corner detection pixel to the class region; creating a corner rounding amount map based on the corner rounding amount; and executing the corner rounding process based on the corner rounding amount map.

According to the second aspect of the present invention, it is preferable that the executing a corner rounding process include: executing a filtering process using an isotropic filter having a size equal to or smaller than a preset value based on a first corner rounding amount assigned to a first class; calculating a difference between the first corner rounding amount and a second corner rounding amount assigned to a second class; and executing the filtering process based on the difference, using the isotropic filter having the size equal to or smaller than the preset value.

According to the second aspect of the present invention, it is preferable that the method further include: applying a label to a pixel corresponding to each pattern in the developed image; and executing the corner rounding process for each label.

Advantageous Effects of Invention

According to the defect inspection apparatus, the defect inspection method, and the defect inspection program of the present invention, it is possible to generate reference image data having patterns in which corners of the patterns are classified and to which corner rounding amounts based on the classes are applied.

BRIEF DESCRIPTION OF THE DRAWING(S)

FIG. 5 is a developed image showing an example of a pattern of a corner detection target in the defect inspection apparatus according to the first embodiment.

FIG. 6 is a developed image showing an example of a pattern of a corner detection target in the defect inspection apparatus according to the first embodiment.

FIG. 12 is a diagram showing an example of a polygonal line function in the defect inspection apparatus according to the first embodiment.

FIG. 13 is a diagram showing an example of a corner rounding process using the isotropic filter described with reference to FIG. 11.

FIG. 16 is a diagram showing an example of labeling of pixels in a developed image in the defect inspection apparatus according to the second embodiment.

FIG. 17 is a diagram showing an example of an isotropic filter corresponding to a label A in the defect inspection apparatus according to the second embodiment.

DETAILED DESCRIPTION

Figure 1:
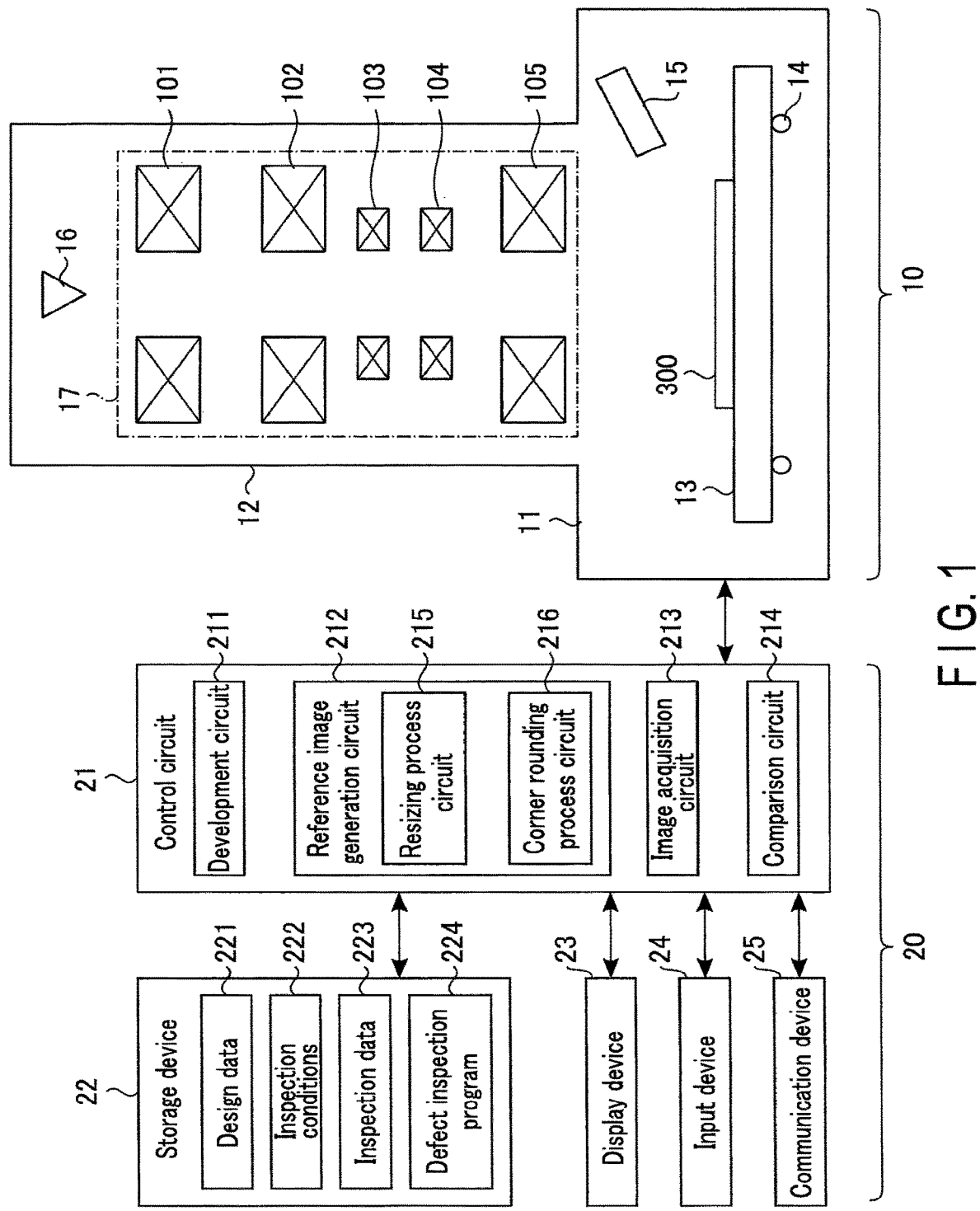
FIG. 1 is a diagram showing an overall configuration of a defect inspection apparatus according to a first embodiment.

The embodiments will now be described with reference to the drawings. The embodiment will exemplify apparatuses and methods for embodying the technical idea of the invention. The drawings are schematic or conceptual, and the dimensions, scales, etc., used in the drawings are not binding on actual products. The technical idea of the present invention is not specified by the shape, structure, arrangement, and the like of the structural elements.

Hereinafter, as a defect inspection apparatus for a sample, a defect inspection apparatus that captures an electron beam image (hereinafter, also referred to as an "SEM image") of a measurement target pattern using a scanning electron microscope (hereinafter, referred to as an "SEM") will be described. The defect inspection apparatus may capture an optical image of a pattern using an optical microscope, or may capture an optical image of light reflected by or transmitted through the sample using a light receiving element. A case will be described as the embodiment in which a sample of the inspection target is a mask, but the sample may be anything as long as patterns are formed on a surface thereof, such as a wafer or a substrate for use in a liquid crystal display device or the like.

1. First Embodiment 1.1 Overall Configuration of Defect Inspection Apparatus

First, an example of the overall configuration of the defect inspection apparatus will be described with reference to FIG. 1. FIG. 1 is a diagram showing the overall configuration of a defect inspection apparatus 1.

As shown in FIG. 1, the defect inspection apparatus 1 includes an imaging mechanism 10 and a control mechanism 20.

The imaging mechanism 10 includes a sample chamber 11 and an optical column 12. The optical column 12 is disposed on the sample chamber 11. For example, the optical column 12 has a cylindrical shape extending perpendicularly with respect to the sample chamber 11. The surfaces of the sample chamber 11 and the optical column 12 that are in contact with each other are open. A space formed by the sample chamber 11 and the optical column 12 is maintained in a vacuum (decompressed) state using a turbo-molecular pump or the like.

A stage 13, a stage driving mechanism 14, and a detector 15 are provided in the sample chamber 11.

A sample (mask) 300 is placed on the stage 13. The stage 13 is movable in an X direction parallel to the surface of the stage 13 and in a Y direction parallel to the surface of the stage 13 and intersecting the X direction. Further, the stage 13 may be movable in a Z direction perpendicular to the surface of the stage 13, or may be rotatable around a rotation axis on the XY plane with the Z direction as the rotation axis.

The stage driving mechanism 14 includes a driving mechanism for moving the stage 13 in the X direction and the Y direction. The stage driving mechanism 14 may include, for example, a mechanism that moves the stage 13 in the Z direction or a mechanism that rotates the stage 13 around a rotation axis on the XY plane with the Z direction as the rotation axis.

The detector 15 detects secondary electrons, reflected electrons, or the like emitted from the sample. The detector 15 transmits a signal of the detected secondary electrons or reflected electrons, that is, data of the SEM image to an image acquisition circuit 213.

An electron gun 16 and an electron optical system 17, which are components of the SEM, are provided in the optical column 12.

The electron gun 16 is disposed so as to emit an electron beam toward the sample chamber 11.

The electron optical system 17 converges the electron beam emitted from the electron gun 16 and irradiates a predetermined position of the sample 300 with the converged electron beam. For example, the electron optical system 17 includes a plurality of focusing lenses 101 and 102, a plurality of scanning coils 103 and 104, and an objective lens 105. The electron beam emitted from the electron gun 16 is accelerated and then focused as an electron spot on the surface of the sample 300 placed on the stage 13 by the focusing lenses 101 and 102 and the objective lens 105. The scanning coils 103 and 104 control the position of the electron spot on the sample 300.

The control mechanism 20 includes a control circuit 21, a storage device 22, a display device 23, an input device 24, and a communication device 25.

The control circuit 21 performs total control over the defect inspection apparatus 1. More specifically, the control circuit 21 controls the imaging mechanism 10 to acquire the SEM image. Further, the control circuit 21 controls the control mechanism 20 to compare a generated reference image with an inspection image to detect a defect. That is, the control circuit 21 is a processor for executing a defect inspection. For example, the control circuit 21 includes a central processing unit (CPU), a random access memory (RAM), and a read only memory (ROM), which are not illustrated. For example, the CPU loads a program stored in the ROM or the storage device 22 as a non-transitory storage medium into the RAM. Then, the control circuit 21 causes the CPU to interpret and execute the program loaded in the RAM to control the defect inspection apparatus 1. The control circuit 21 may be, for example, a CPU device such as a microprocessor, or a computer device such as a personal computer. The control circuit 21 may include a dedicated circuit (dedicated processor) in which at least a part of functions is performed by another integrated circuit, such as an application specific integrated circuit (ASIC), a field programmable gate array (FPGA), or a graphics processing unit (GPU).

The control circuit 21 includes a development circuit 211, a reference image generation circuit 212, an image acquisition circuit 213, and a comparison circuit 214. These may be configured by a program executed by the integrated circuit such as the CPU, the ASIC, the FPGA, the GPU, etc., may be configured by hardware or firmware included in the integrated circuit, or may be configured by discrete circuits controlled by the integrated circuit. A case will be described in which the control circuit 21 realizes the functions of the development circuit 211, the reference image generation circuit 212, the image acquisition circuit 213, and the comparison circuit 214 by executing a program.

For example, the development circuit 211 develops design data stored in the storage device 22 into data for each pattern (figure), and interprets a figure code, figure dimensions, and the like which are indicating a figure shape of the figure data. Then, the development circuit 211 generates a binary or multi-valued (for example, 8-bit) image (hereinafter, also referred to as a "CAD image" or a "developed image") as a pattern arranged in squares having a grid of a predetermined quantization size as a unit. The development circuit 211 calculates an occupancy rate of the figure for each pixel of the developed image. Thus, the calculated figure occupancy rate in each pixel is a pixel value. Hereinafter, a case will be described in which the pixel value of the developed image is represented by 8-bit gradation data. In this case, the pixel value of each pixel is represented by a gradation value of 0 to 255. When the pixel value is 0, the figure occupancy rate is 0%, and when the pixel value is 255, the figure occupancy rate is 100%.

The reference image generation circuit 212 performs a resizing process and a corner rounding process on the developed image. Then, the reference image generation circuit 212 extracts an outline from the developed image after the resizing process and the corner rounding process to generate a reference image (outline image). The reference image generation circuit 212 transmits the generated reference image to the comparison circuit 214 and the storage device 22. The reference image generation circuit 212 includes a resizing process circuit 215 and a corner rounding process circuit 216.

The resizing process circuit 215 executes the resizing process to move edge positions of the patterns of the developed image.

The corner rounding process circuit 216 executes the corner rounding process for corner portions of each pattern after the resizing process. More specifically, the corner rounding process circuit 216 of the present embodiment detects pixels including corners, and performs classification of the corners (detected pixels). The corner rounding process circuit 216 assigns a corner rounding amount (hereinafter, also simply referred to as a "rounding amount") set in advance for each class to a pixel including a corner and peripheral pixels thereof. The corner rounding process circuit 216 generates a corner rounding amount map representing the corner rounding amount of each pixel. Then, the corner rounding process circuit 216 executes the corner rounding process based on the corner rounding amount map.

The image acquisition circuit 213 acquires data of the SEM image from the detector 15 of the imaging mechanism 10. The image acquisition circuit 213 extracts an outline from the SEM image to generate an inspection image (outline image).

The comparison circuit 214 performs alignment between the inspection image and the reference image, and calculates a shift amount of the inspection image with respect to the reference image. In addition, the comparison circuit 214 measures a distortion amount of the inspection image from, for example, variation in the shift amount in the surface of the sample 300, and calculates a distortion coefficient. The comparison circuit 214 compares the inspection image with the reference image using an appropriate algorithm in consideration of the shift amount and the distortion coefficient. When the error between the inspection image and the reference image exceeds a preset value, the comparison circuit 214 determines that there is a defect at the corresponding coordinate position of the sample 300.

The storage device 22 stores data and programs related to defect inspections. For example, the storage device 22 stores design data 221, parameter information 222 of inspection conditions, inspection data 223, and the like. More specifically, for example, the parameter information 222 of the inspection conditions includes imaging conditions of the imaging mechanism 10, reference image generation conditions (corner classification information, and the like), defect detection conditions, and the like. The inspection data 223 includes image data (the developed images, the reference images, the SEM images, and the inspection images), and data (coordinates, size, and the like) related to the detected defects. The storage device 22 stores a defect inspection program 224 as a non-transitory storage medium. The defect inspection program 224 is a program for causing the control circuit 21 to execute the defect inspection.

The storage device 22 may include, as external storages, various storage devices such as a magnetic disk storage device (hard disk drive: HDD), a solid state drive (SSD), and the like. Further, the storage device 22 may include, for example, a drive for reading a program stored in a compact disc (CD), a digital versatile disc (DVD), or the like as a non-transitory storage medium.

The display device 23 includes, for example, a display screen (for example, a liquid crystal display (LCD) or an electroluminescence (EL) display). The display device 23 displays, for example, a defect detection result under the control of the control circuit 21.

The input device 24 is an input device such as a keyboard, a mouse, a touch panel, or a button switch.

The communication device 25 is a device for connecting to a network in order to transmit and receive data to and from an external device. Various communication standards may be used for the communication. For example, the communication device 25 receives design data from the external device, and transmits a result of defect inspection and the like to the external device.

1.2 Overall Flow of Inspection Process

Figure 2:
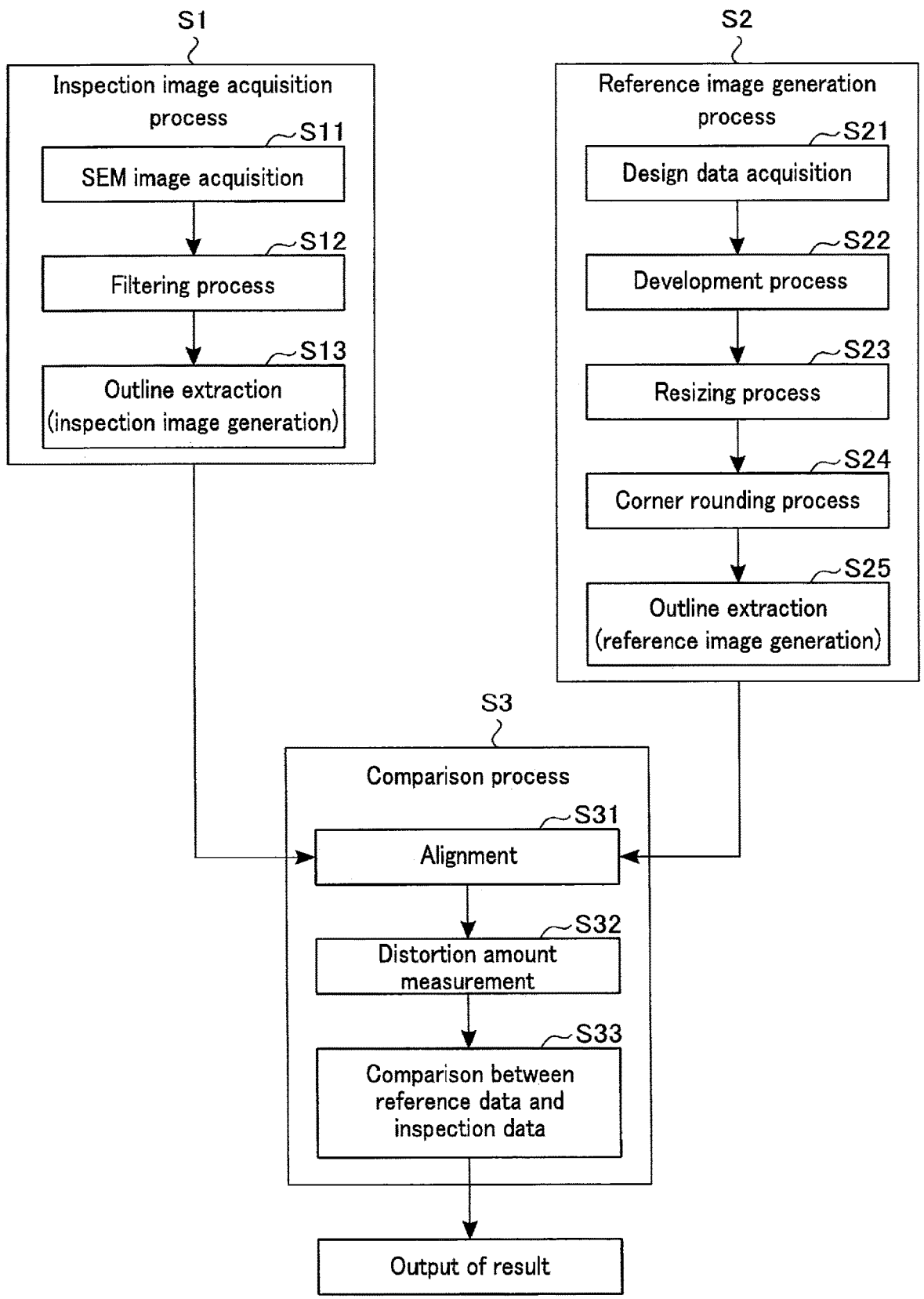
FIG. 2 is a flowchart of an inspection process in the defect inspection apparatus according to the first embodiment.

Next, an example of an overall flow of the inspection process will be described with reference to FIG. 2. FIG. 2 is a flowchart of the inspection process.

As shown in FIG. 2, the inspection process roughly includes an inspection image acquisition process (step S1), a reference image generation process (step S2), and a comparison process (step S3).

1.2.1 Inspection Image Acquisition Process

First, an example of the inspection image acquisition process of step S1 will be described. The image acquisition circuit 213 acquires the SEM image of the sample 300 from the imaging mechanism 10 (step S11).

Next, the image acquisition circuit 213 performs a filtering process to remove noise from the acquired SEM image (step S12).

Next, the image acquisition circuit 213 extracts the outline of each pattern from the SEM image after the filtering process (step S13), and generates an inspection image (outline image). More specifically, the image acquisition circuit 213 extracts a plurality of outline positions (actual image outline positions) of each figure pattern in the SEM image for each SEM image as the actual image (inspection image).

Figure 3:
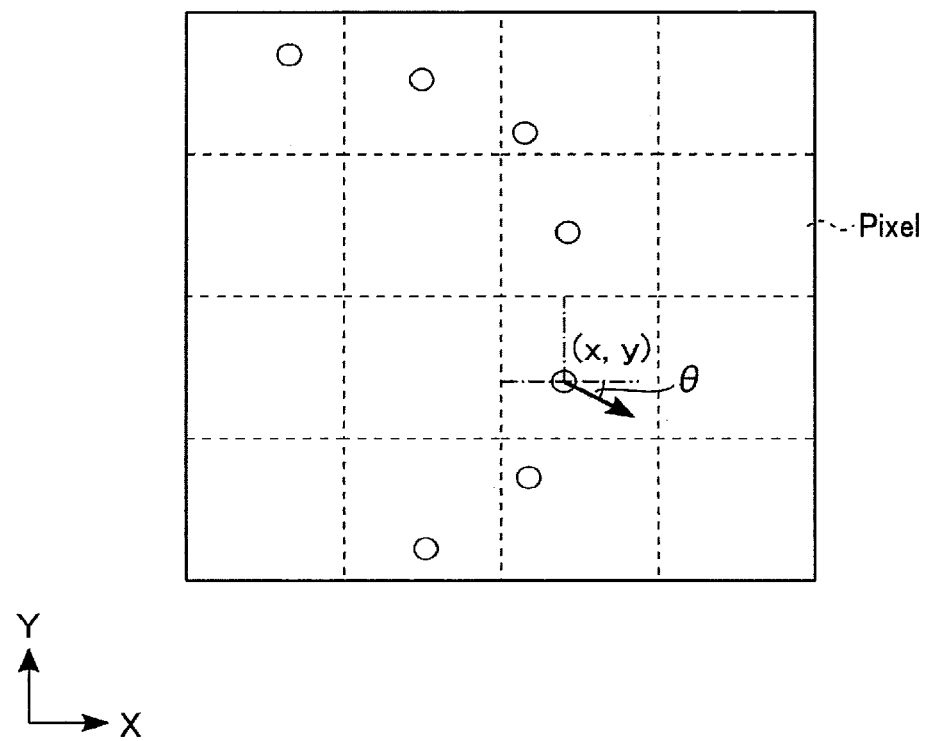
FIG. 3 is a diagram showing an example of an actual image outline position in the defect inspection apparatus according to the first embodiment.

Hereinafter, an example of extraction of the actual image outline position in the image acquisition circuit 213 will be described. FIG. 3 is a diagram showing an example of actual image outline positions.

The image acquisition circuit 213 performs a differential filtering process for differentiating each pixel in the X direction and the Y direction using a differential filter such as a Sobel filter, and synthesizes primary differential values in the X direction and the Y direction. Then, the peak position of a profile using a synthesized primary differential value is extracted as an outline position on the outline (actual image outline). The example of FIG. 3 shows a case where one outline position is extracted from each of a plurality of pixels (outline pixels) through which the actual image outline passes. The outline position is extracted in units of sub-pixels in each outline pixel. In the example of FIG. 3, coordinates (x, y) in a pixel indicate an outline position. An angle θ indicates an angle of the normal direction at each outline position of an outline approximated by fitting a plurality of outline positions with a predetermined function. The angle θ of the normal direction is defined as, for example, a clockwise angle with respect to the X axis. The obtained information of each actual image outline position (actual image outline data) is stored in the storage device 22. In this example, the case where the Sobel filter is used has been described, but the outline extraction filter is not limited to the Sobel filter.

The image acquisition circuit 213 transmits the generated inspection image to the comparison circuit 214 and the storage device 22.

1.2.2 Reference Image Acquisition Process

Next, an example of the reference image acquisition process will be described. For example, the defect inspection apparatus 1 acquires design data via the communication device 25 (step S21). The acquired design data is stored in, for example, the storage device 22.

The development circuit 211 reads the design data stored in the storage device 22. Then, the development circuit 211 performs a development process to develop (convert) the design data into, for example, 8-bit image data (developed image) (step S22). Each pixel of the developed image has a value corresponding to the occupancy rate of the figure of the design data in the pixel. For example, in the case of 8-bit image data, the pixel value is 0 when the occupancy rate of the design figure is 0%, and the pixel value is 255 when the occupancy rate is 100%. The development circuit 211 transmits the developed image to the reference image generation circuit 212 and the storage device 22.

The resizing process circuit 215 executes the resizing process for the developed image (step S23).

Next, the corner rounding process circuit 216 classifies the corners of each resizing-processed pattern, and then performs the corner rounding process (step S24). Details of the corner rounding process will be described later.

The reference image generation circuit 212 extracts the outline of the pattern from the developed image that has been subjected to the resizing process and the corner rounding process (step S25), and generates a reference image (outline image). The reference image generation circuit 212 transmits the generated reference image to the comparison circuit 214 and the storage device 22.

1.2.3 Comparison Process

Next, an example of the comparison process will be described. First, the comparison circuit 214 performs alignment using the inspection image and the reference image (step S31), and performs alignment between the patterns in the inspection image and the patterns in the reference image.

For example, a relative vector between each outline position of the actual image (inspection image) and the corresponding outline position of the reference image is obtained, and an average value thereof is set as an alignment shift amount. At this time, the comparison circuit 214 calculates the alignment shift amount of the inspection image with respect to the reference image.

Next, the comparison circuit 214 measures a distortion amount of the inspection image (step S32), and calculates a distortion coefficient. For example, misalignment may occur between coordinate information based on the design data and coordinates of the pattern calculated from the captured image due to the stage movement accuracy, the distortion of the sample 300, or the like. The comparison circuit 214 measures, for example, the distortion amount of the inspection image from the distribution of the local alignment shift amounts in the surface of the sample 300, and calculates the distortion coefficient.

For example, the distortion amount of the coordinates (x, y) is expressed by the following equations, where the distortion amounts are represented by dx and dy. Here, a1 to a4 and b1 to b4 are distortion coefficients. Each distortion coefficient can be calculated by an optimization method, such as a least square method, using a relative vector (dx, dy) between each outline point of the inspection image and a corresponding outline point of the reference image.

$$dx(x,y)=a_1+a_2x+a_3y+a_4xy$$

$$dy(x,y)=b_1+b_2x+b_3y+b_4xy$$

Since the distortion amount at each outline point can be calculated by the calculated distortion coefficient, it is used for the relative vector calculation between the inspection image and the reference image together with the alignment shift amount in step S33 to be described later.

Next, the comparison circuit 214 compares the inspection image with the reference image (step S33). The comparison circuit 214 detects defects on the basis of the comparison result. In other words, as the comparison process of comparing the inspection image with the reference image, the comparison circuit 214 compares each outline (actual image outline) of the inspection image with a corresponding outline (reference image outline) of the reference image by using the alignment shift amount. For example, the comparison circuit 214 determines that there is a defect when the magnitude (distance) of a defect position deviation vector in consideration of the alignment shift amount between each of the plurality of actual image outline positions and the corresponding reference outline positions exceeds a determination threshold value. The comparison result is output to the storage device 22 or the display device (monitor) 23.

After storing the result of the defect inspection in the storage device 22, the control circuit 21 may display the result on the display device 23, or may output the result to an external device (for example, a review device or the like) via the communication device 25.

1.3 Corner Rounding Process

Figure 4:
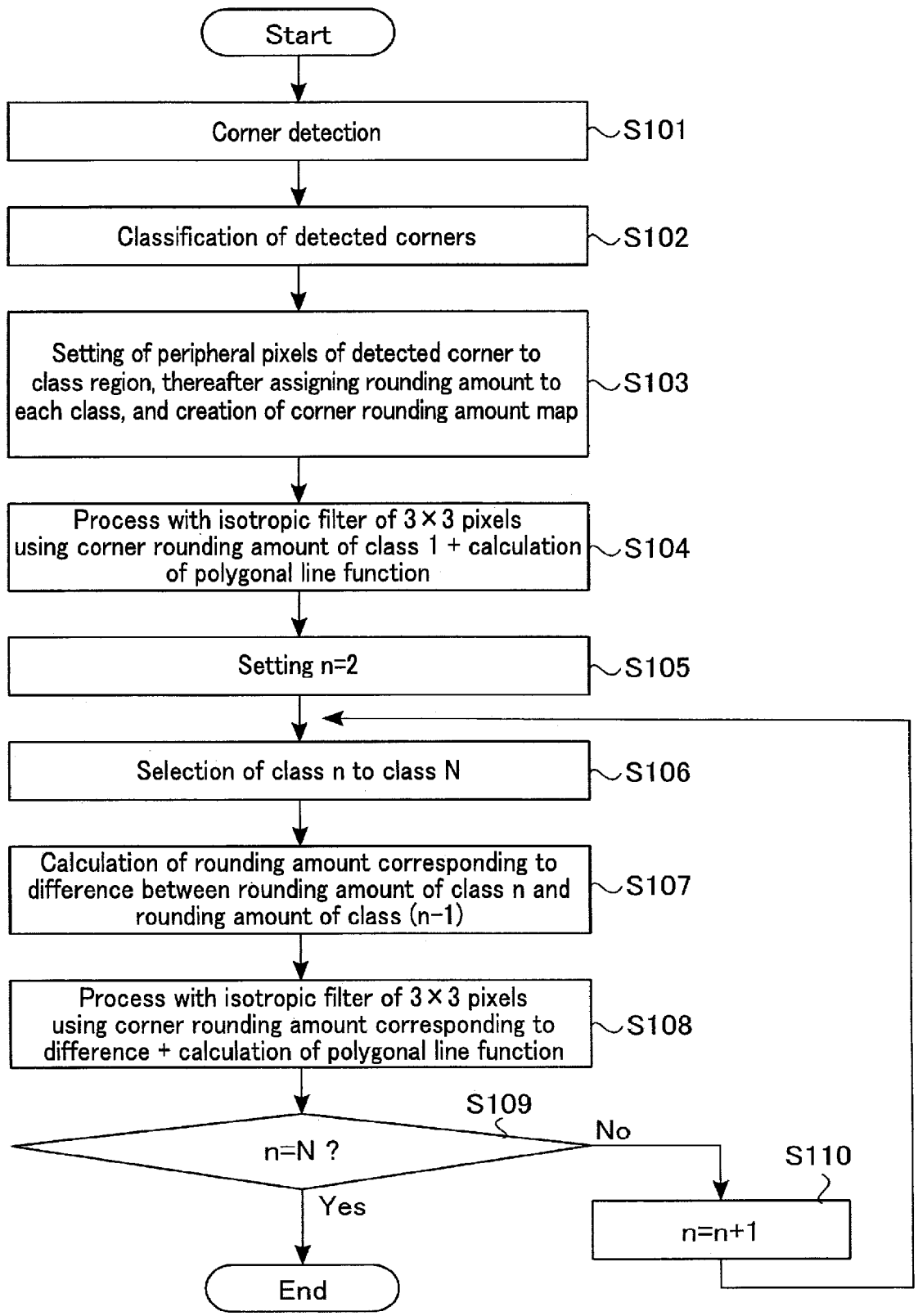
FIG. 4 is a flowchart of a corner rounding process in the defect inspection apparatus according to the first embodiment.

Next, an example of the corner rounding process will be described. FIG. 4 is a flowchart of the corner rounding process. As shown in FIG. 4, the corner rounding process circuit 216 executes steps S101 to S110. Details of each step will be described.

[Step S101]

First, the corner rounding process circuit 216 detects corners of each pattern (figure) of the developed image.

Hereinafter, as an example of the corner detection, a case where a SUSAN (Smallest Univalue Segment Assimilating Nucleus) operator is used will be described with reference to FIGS. 5 and 6. FIG. 5 and FIG. 6 are developed images showing examples of patterns which are corner detection targets.

As shown in FIG. 5 and FIG. 6, first, the corner rounding process circuit 216 sets peripheral pixels within a range set in advance with respect to the pixel of interest (pixels within the broken lines in FIG. 5 and FIG. 6) as calculation target pixels. Note that the set range of the calculation target pixels can be discretionarily set, and may be, for example, 3×3 pixels or 5×5 pixels centered on the pixel of interest. The corner rounding process circuit 216 calculates a difference between the pixel value of each calculation target pixel in the set range and the pixel value (gradation value) of the pixel of interest, and sets "1" to the calculation target pixel when the difference is equal to or smaller than a preset threshold value, and sets "0" when the difference is equal to or larger than the threshold value. Then, the corner rounding process circuit 216 calculates the total number S of calculation target pixels to which "1" is set. For example, a square pattern P1 having a relatively large size as shown in FIG. 5 and a line pattern P2 as shown in FIG. 6 are different from each other in the shape of the pattern in the set range of the calculation target pixel, so that the S values of the pixels of interest are different from each other. The corner rounding process circuit 216 performs the above-described calculation for each pixel of the developed image, and detects a pixel having a minimum S value as a pixel including a corner (hereinafter, also referred to as a "corner detection pixel"). The corner rounding process circuit 216 controls the corner to be detected according to the shape of the pattern and the size of the set range of the calculation target pixel.

[Step S102]

Figure 7:
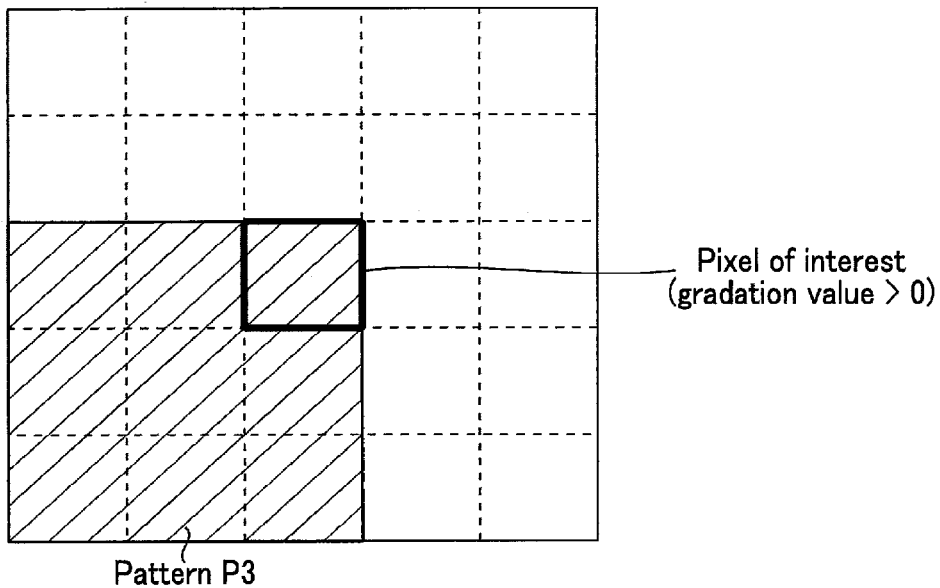
FIG. 7 is a developed image showing an example of a pattern of a corner detection target in the defect inspection apparatus according to the first embodiment.
Figure 8:
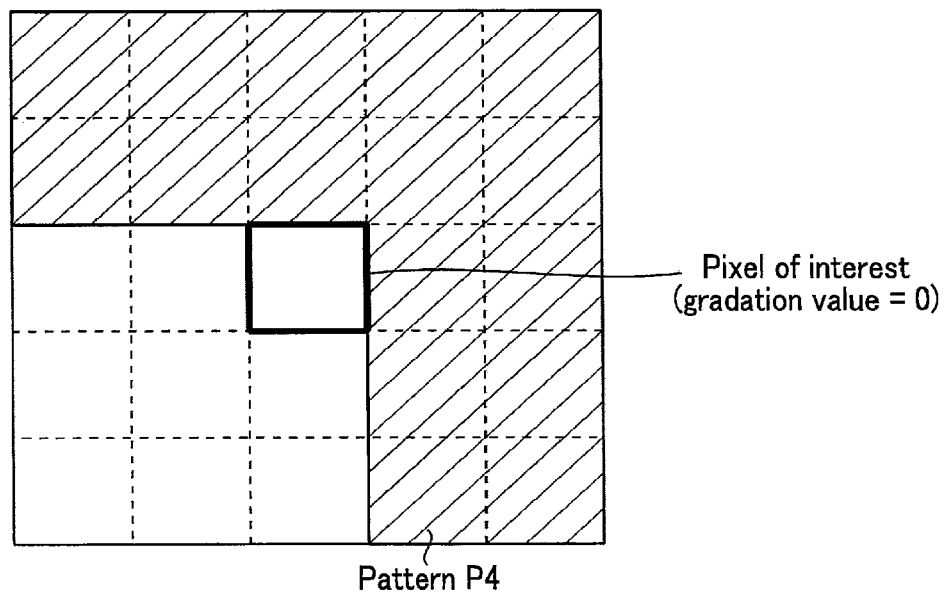
FIG. 8 is a developed image showing an example of a pattern of a corner detection target in the defect inspection apparatus according to the first embodiment.

Next, the corner rounding process circuit 216 performs corner classification based on the S value and the pixel value of the corner detection pixel. For example, if the shapes of the patterns are different as described with reference to FIGS. 5 and 6, the S values of the corner detection pixels may be different. Further, as shown in FIGS. 7 and 8, in a case where the shapes (angles) of the corners are different, the S values may be the same even if the shapes of the patterns are different. FIGS. 7 and 8 are developed images showing examples of patterns which are corner detection targets. For example, a pattern P3 having a corner angle of 90° as shown in FIG. 7 and a pattern P4 having a corner angle of 270° as shown in FIG. 8 have the same S value for the corner detection pixels (pixels of interest). Focusing on the pixel values of the corner detection pixels even if the S values are the same, the pixel value of the pixel of interest including the 90° corner is larger than 0 (for example, 255), and the pixel value of the pixel of interest including the 270' corner is 0. Therefore, the corner rounding process circuit 216 performs classification of the corner detection pixels in accordance with the classification set in advance based on the patterns and the shapes of the corners, in other words, the S values and the pixel values of the corner detection pixels. Hereinafter, a case will be described in which the corner detection pixels are classified into classes 1 to N (N is an integer equal to or greater than 2) in ascending order of the corner rounding amounts.

[Step S103]

Figure 9:
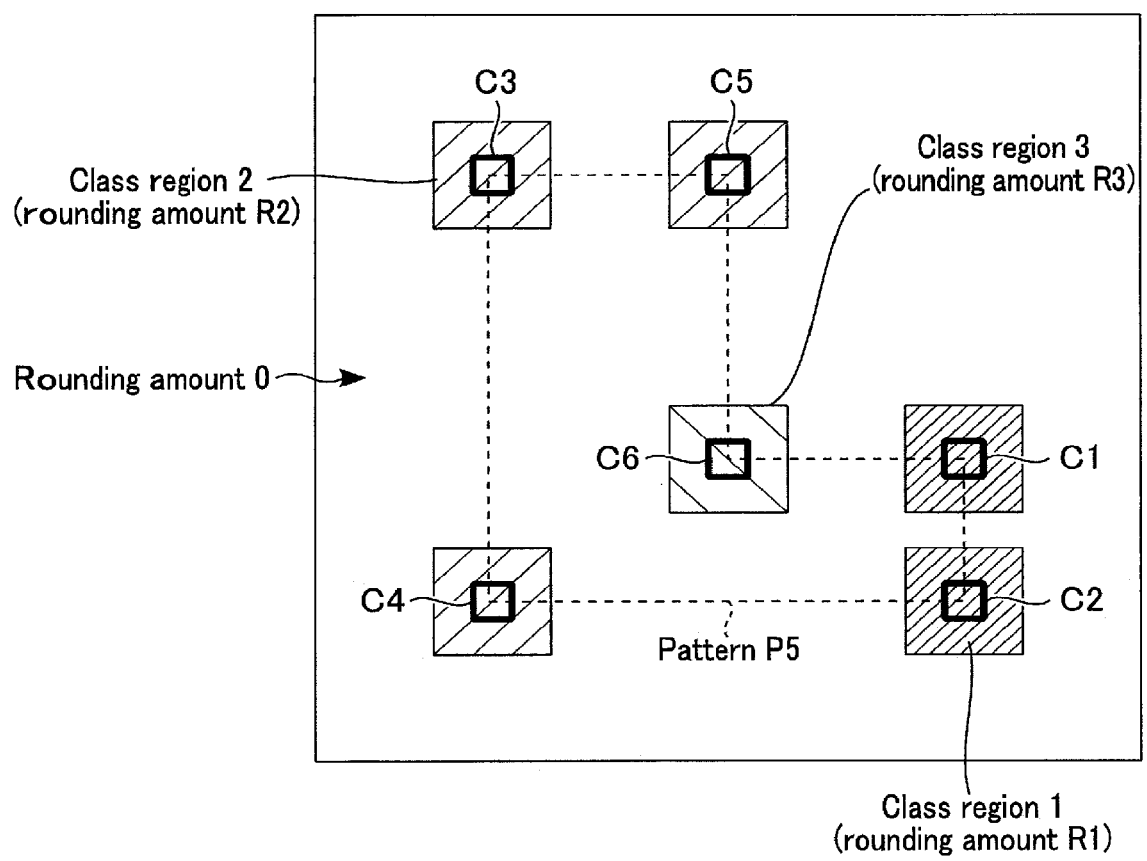
FIG. 9 is a diagram showing an example of a corner rounding amount map in the defect inspection apparatus according to the first embodiment.

Next, the corner rounding process circuit 216 sets the corner detection pixel and its peripheral pixels as a class region corresponding to the class of the corner detection pixel. Note that the range of the peripheral pixels included in the class region can be arbitrarily set, and may be, for example, 3×3 pixels or 5×5 pixels around the corner detection pixel. For example, the corner rounding process circuit 216 may set different ranges of peripheral pixels for different class regions. Then, the corner rounding process circuit 216 assigns a corner rounding amount corresponding to the class to each class region, and creates a corner rounding amount map. FIG. 9 is a diagram illustrating an example of the corner rounding amount map.

As shown in FIG. 9, the corner rounding process circuit 216 detects six pixels C1 to C6 as corner detection pixels for a pattern P5. For example, the corner rounding process circuit 216 classifies the pixels C1 and C2 into a class 1, classifies the pixels C3 to C5 into a class 2, and classifies the pixel C6 into a class 3. In this state, the corner rounding process circuit 216 sets the pixels C1 and C2 and the peripheral pixels of the pixels C1 and C2 to a class region 1. Then, the corner rounding process circuit 216 assigns a corner rounding amount R1 of the class 1 to each pixel of the class region 1. Similarly, the corner rounding process circuit 216 sets the pixels C3 to C5 and the peripheral pixels of the pixels C3 to C5 to a class region 2, and assigns a corner rounding amount R2 (>R1) of the class 2 to each pixel of the class region 2. Further, the corner rounding process circuit 216 sets the pixel C6 and the peripheral pixels of the pixel C6 to a class region 3, and assigns a corner rounding amount R3 (>R2) of the class 3 to each pixel of the class region 3. Note that a corner rounding amount of 0 is assigned to each of the pixels not included in any class region.

[Step S104]

Next, the corner rounding process circuit 216 executes, in each class region, the filtering process by an isotropic filter of 3×3 pixels using the corner rounding amount R1 of the class 1 and the corner rounding process by the calculation of a polygonal line function using the result of the filtering process.

Figure 10:
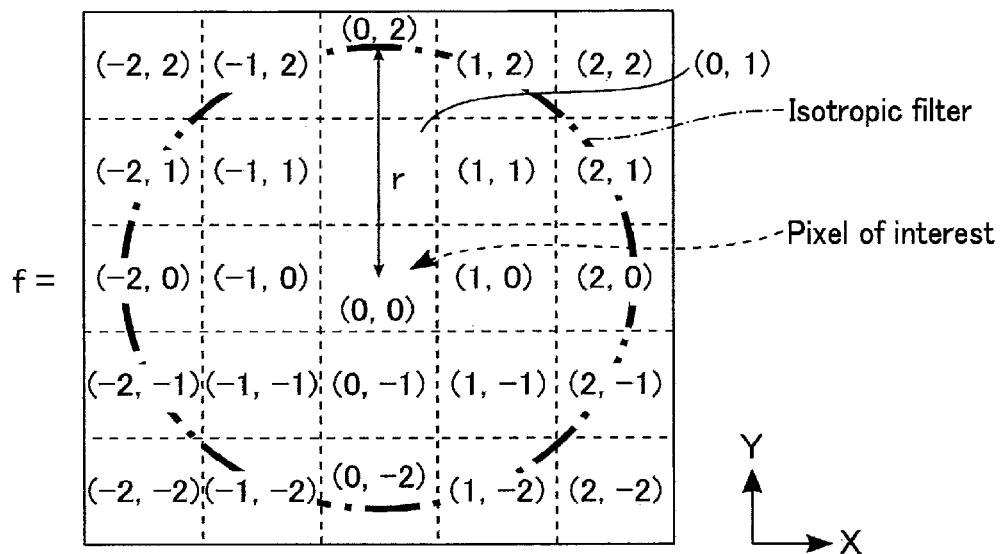
FIG. 10 is a diagram showing an example of an isotropic filter for use in the corner rounding process in the defect inspection apparatus according to the first embodiment.
Figure 11:
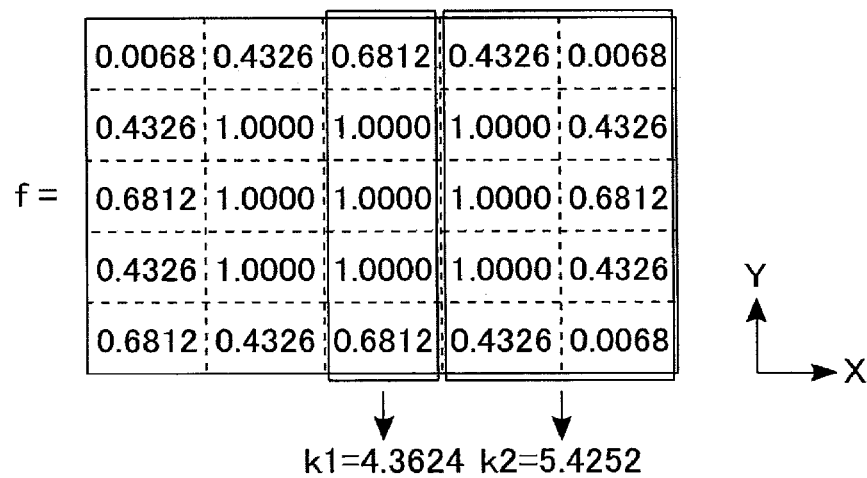
FIG. 11 is a diagram showing a specific example of the isotropic filter in the defect inspection apparatus according to the first embodiment.

Here, an example of the corner rounding process will be described with reference to FIGS. 10 to 12. FIG. 10 is a diagram showing an example of an isotropic filter for use in the corner rounding process. FIG. 11 is a diagram showing a specific example of the isotropic filter. FIG. 12 is a diagram showing an example of a polygonal line function.

In the present embodiment, the corner rounding process (correction of the pixel value) of the target pixel is performed by applying the polygonal line function to the result of a filtering process using the isotropic filter.

As shown in FIG. 10, for example, a filtering process (convolution operation) using an isotropic filter with a radius r=R is performed on the corner rounding amount R. More specifically, for example, if the corner rounding amount R is 1.5<R≤2.5, the size of an isotropic filter f is represented by a kernel of 5×5 pixels centered on the pixel of interest. Here, assuming that the coordinates of the pixel of interest are (0, 0), the coordinates of each pixel are represented by (x, y)=(−2, 2) to (2, −2) from the lower left to the upper right in the drawing.

First, the corner rounding process circuit 216 performs an operation of Equation (1), and performs a convolution operation of the isotropic filter f and the pixel of interest. Here, I indicates the pixel value of the pixel of interest.

(Equation 1)

$$I'=f*I \tag{1}$$

Next, the corner rounding process circuit 216 calculates coefficients k1 and k2 of the polygonal line function by performing operations of Equations (2) and (3). The coefficient k1 represents the total value (areas) of isotropic filter f having an X coordinate of 0. The coefficient k2 represents the total value (areas) of isotropic filter f having an X coordinate of 1 or more.

(Equation 2)

$$k_1 = \Sigma_y f(0,y) \tag{2}$$

(Equation 3)

$$k_2 = \Sigma_{x,y} f(x,y), (x>1) \tag{3}$$

Next, the corner rounding process circuit 216 performs an operation of a polygonal line function L of Equation (4) to calculate the pixel value of the pixel x of interest after the corner rounding process. Here, $I_{max}$ indicates a maximum pixel value; for example, if the pixel value is represented by 0 to 255, Imax=255.

(Equation 4)

$$L(I') = \begin{cases} 0, & I' < I_{max}k_2 \\ I_{max}, & I' > I_{max}(k_1 + k_2) \\ (I' - I_{max}k_2)/k_1, & \text{else} \end{cases} \tag{4}$$

As shown in FIG. 11, in the isotropic filter f of 5×5 pixels, for example, the values of the coordinates (−2, 2), (2, 2), (−2, −2), and (2, −2) are set to 0.0068. The values of the coordinates (−1, 2), (1, 2), (−2, 1), (2, 1), (−2, −1), (2, −1), (−1, −2), and (1, −2) are set to 0.4326. The values of the coordinates (0, 2), (−2, 0), (2, 0), and (0, −2) are set to 0.6812. The values of the other coordinates are set to 1. In such a case, $k_1$=4.3624 and $k_2$=5.4252. Therefore, the polygonal line function L in the case of Imax=255 is represented by the graph shown in FIG. 12.

A specific example of the corner rounding process using the isotropic filter of 5×5 pixels described with reference to FIG. 11 will be described with reference to FIG. 13. FIG. 13 is a diagram showing pixel values of the respective pixels before and after the corner rounding process in one class region. In the example of FIG. 13, the same value continues in the pixels on the left, right, upper, and lower sides outside the class region.

As shown in FIG. 13, for example, in a case where the class region is set as 7×7 pixels centered at the coordinates (4, 4) of the corner detection pixel, the pixel value 165 of the coordinates (4, 4) becomes 0 by the corner rounding process. The pixel value 196 of the coordinates (4, 5) becomes 120. The pixel value 196 of the coordinates (4, 6) becomes 187. The pixel value 216 of the coordinates (5, 4) becomes 126. The pixel value 216 of the coordinates (6, 4) becomes 202. In the example of FIG. 13, the pixel values of the other pixels in the class region do not vary.

[Step S105]

Next, the corner rounding process circuit 216 sets n=2 (n is an integer satisfying 1<n<N) as a variable n representing a class and a class region.

[Step S106]

Next, the corner rounding process circuit 216 selects the class region n to the class region N as the target class regions of the corner rounding process.

[Step S107]

Next, the corner rounding process circuit 216 calculates the corner rounding amount corresponding to the difference between a corner rounding amount Rn of a class n and a corner rounding amount R (n−1) of a class (n−1). For example, in the case of n=2, the corner rounding process circuit 216 calculates the corner rounding amount corresponding to the difference between the corner rounding amount R2 of the class 2 and the corner rounding amount R1 of the class 1.

[Step S108]

Next, the corner rounding process circuit 216 executes, in the selected class regions n to N, the corner rounding process through the convolution operation by the isotropic filter of 3×3 pixels using the corner rounding amount (Rn−R(n−1)) corresponding to the difference and the operation of the polygonal line function using the result of the convolution operation.

[Step S109]

In the case of n=N (step S109_Yes), that is, if the selected class region is a class region having the largest corner rounding amount, the corner rounding process circuit 216 ends the corner rounding process.

[Step S110]

In the case of n<N in step S109 (step S109_No), the corner rounding process circuit 216 counts up the variable n to n=n+1, and proceeds to step S106. The corner rounding process circuit 216 repeatedly performs the corner rounding process until the variable n becomes N.

1.4 Corner Rounding Process Using Isotropic Filter of 3×3 Pixels

Figure 14:
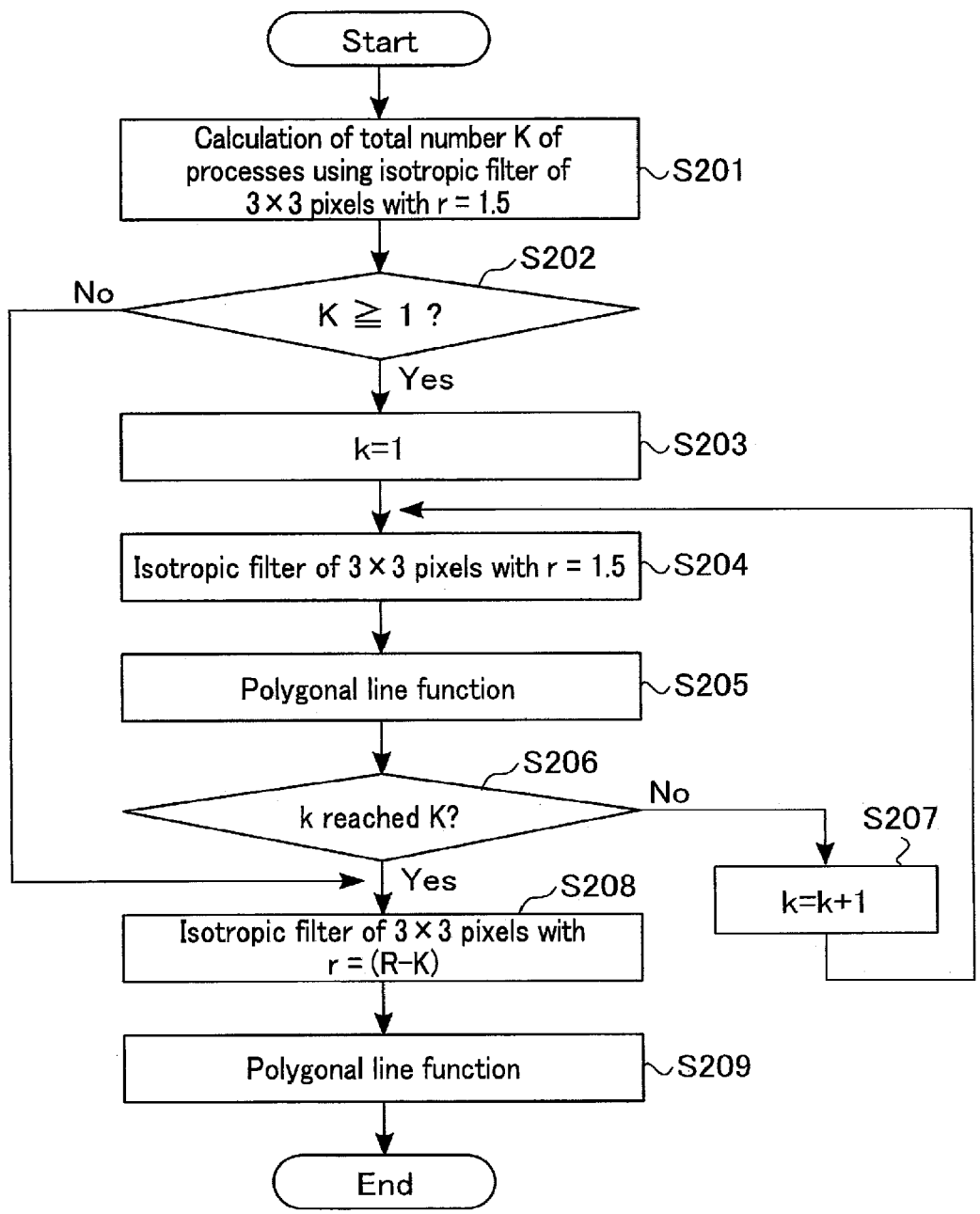
FIG. 14 is a flowchart of a corner rounding process using an isotropic filter of 3×3 pixels in the defect inspection apparatus according to the first embodiment.

Next, a specific example of the corner rounding process using the isotropic filter of 3×3 pixels described with reference to FIG. 4 will be described with reference to FIG. 14. FIG. 14 is a flowchart of a corner rounding process using the isotropic filter of 3×3 pixels.

The corner rounding process circuit 216 of the present embodiment executes the filtering process using the isotropic filter of 3×3 pixels a plurality of times in accordance with the corner rounding amount R. For example, when the radius of the isotropic filter of 3×3 pixels is r, the maximum value of r is 1.5. For this reason, if the corner rounding amount R is larger than r=1.5, the corner rounding process of r=1.5 is repeated K times (K is an integer), and then the corner rounding process of r<1.5 is executed.

As shown in FIG. 14, first, the corner rounding process circuit 216 performs an operation of K=ceil (R−0.5)−1 to calculate the total number K of processes of the corner rounding process using the isotropic filter of 3×3 pixels with r=1.5 (step S201). Here, "ceil" indicates rounding up of a fraction.

If the total number of processes K1≥1 (step S202_Yes), that is, if the corner rounding amount R is equal to or larger than 1.5, the corner rounding process circuit 216 sets k=1, where k is the count value of the number of the corner rounding processes for r=1.5 (k is a discretionary integer) (step S203).

Next, the corner rounding process circuit 216 performs a corner rounding process using the isotropic filter of 3×3 pixels with r=1.5 (step S204). Then, the corner rounding process circuit 216 calculates the pixel value of each pixel in each class region by the operation of the polygonal line function using the result of the filtering process (step S205).

If the count value k is not equal to K (step S206_No), that is, if the count value k has not reached the total number of processes K, the corner rounding process circuit 216 increments the count value k so that k=k+1 (step S207), and proceeds to step S204. The corner rounding process circuit 216 repeats steps S204 to S207 until the count value k reaches the total number of processes K.

If the total number of processes K is 0 (step S202_No), or if the count value k=K (step S206_Yes), that is, if the corner rounding process using the 3×3 pixel isotropic filter of 3×3 pixels with r=1.5 is finished, the corner rounding process circuit 216 executes the corner rounding process using an isotropic filter of 3×3 pixels with r=(R−K) (step S208). More specifically, in the case of the corner rounding amount R≤1.5, the total number of processes K is 0, and thus the corner rounding process circuit 216 executes a corner rounding process using an isotropic filter of 3×3 pixels with r=R. In the case of the corner rounding amount R>1.5, the corner rounding process circuit 216 executes a corner rounding process using an isotropic filter of 3×3 pixels with a radius r obtained by subtracting the total number of processes K from the corner rounding amount R. Then, the corner rounding process circuit 216 calculates the pixel value of each pixel in each class region by the operation of the polygonal line function using the result of the filtering process (step S209).

By limiting the size of the isotropic filter to 3×3 pixels or less in this way, it is possible to suppress an error that occurs when the filter size becomes larger than the pattern minimum size.

1.5 Advantages of Embodiment

With the configuration according to the present embodiment, the defect inspection apparatus can classify the corners based on the pattern and the shapes of the corners and set different corner rounding amounts for the respective classes when generating the reference image. Therefore, the defect inspection apparatus can generate reference image data having different corner rounding amounts based on the pattern and the shapes of the corners thereof. Accordingly, it is possible to reduce the misalignment between the inspection image and the reference image where the dimension shift occurs. Therefore, extraction of pseudo defects by the defect inspection can be reduced, and the reliability of the defect inspection can be improved.

Furthermore, with the configuration according to the present embodiment, the peripheral pixels including the corner detection pixel can be set as a class region, and different corner rounding amounts can be assigned to the respective class regions. By assigning the corner rounding amount based on the classification, the degree of corner coincidence of not only a simple pattern such as a rectangular pattern but also a complicated pattern such as an optical proximity correction (OPC) pattern can be increased as compared with the case where the corner rounding amount is calculated from the size or the like of each corner.

2. Second Embodiment

Next, a second embodiment will be described. In the second embodiment, a method of a corner rounding process different from that in the first embodiment will be described. Hereinafter, differences from the first embodiment will be mainly explained.

2.1 Corner Rounding Process

Figure 15:
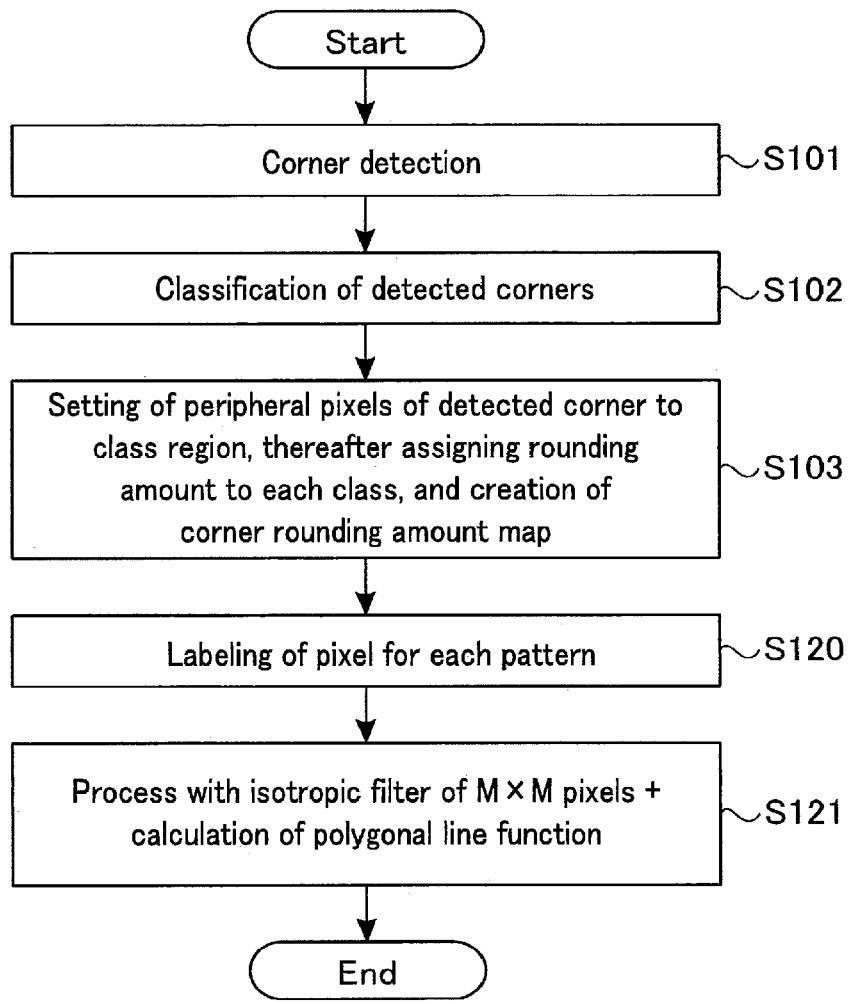
FIG. 15 is a flowchart of a corner rounding process in a defect inspection apparatus according to a second embodiment.

An example of the corner rounding process in the present embodiment will be described. FIG. 15 is a flowchart of the corner rounding process. As shown in FIG. 4, the corner rounding process circuit 216 executes steps S101 to S103, and S120 and S121. Steps S101 to S103 are the same as those in FIG. 4 of the first embodiment.

[Step S120]

After creating the corner rounding amount map, the corner rounding process circuit 216 labels pixels for each pattern. FIG. 16 is a diagram showing an example of labeling of pixels in a developed image.

As shown in FIG. 16, the corner rounding process circuit 216 labels, for example, a pixel of a pattern P6 and each pixel of patterns P7 to P10 arranged in the vicinity so as to be distinguished from one another. More specifically, the corner rounding process circuit 216 labels each pixel of the pattern P6 with, for example, a label A. Similarly, the corner rounding process circuit 216 labels each pixel of the pattern P7 with a label B. The corner rounding process circuit 216 labels each pixel of the pattern P8 with a label C. The corner rounding process circuit 216 labels each pixel of the pattern P9 with a label D. The corner rounding process circuit 216 labels each pixel of the pattern P10 with a label E.

[Step S121]

Next, the corner rounding process circuit 216 executes, for each label, a corner rounding process by a filtering process (convolution operation) using an isotropic filter of M×M pixels (M is an odd number of 3 or more) based on the corner rounding amount R of each class region and an operation of a polygonal line function using the result of the filtering process. The corner rounding process circuit 216 sets the pixel value of the pixels of a non-target label to, for example, 0, when executing the filtering process of the pixels of a target label, so that the filtering process is not affected by the pixels of the non-target label.

A specific example of the corner rounding process for each label will be described with reference to FIG. 17. FIG. 17 is a diagram showing an example of an isotropic filter corresponding to the label A.

As shown in FIG. 17, for example, a pixel of the label B may be included in an isotropic filter of 5×5 pixels for the pixel of interest of the label A. In such a case, the corner rounding process circuit 216 sets the pixel value of the pixel of the label B to 0, and executes the convolution operation of the pixel of interest of the label A.

In this way, by applying the isotropic filter only to figures having the same label, it is possible to suppress an error caused by different figures entering the range of the filter due to a decrease in the distance between figures.

2.2 Advantages of Embodiment

The configuration of the present embodiment can attain advantages similar to those of the first embodiment.

In addition, with the configuration according to the present embodiment, it is possible to label the pixel corresponding to each pattern, and execute a corner rounding process for each label. As a result, the effect of a proximity pattern can be reduced when the filtering process using the isotropic filter is executed.

3. Modification, Etc.

In the first and second embodiments described above, the case where the SUSAN operator is used for corner detection has been described, but another corner detection method may be used. The corner detection method may be, for example, the Harris or Moravec corner detection method.

The first and second embodiments described above may be combined. For example, in the second embodiment, if the corner rounding amount R is larger than 1.5, the filtering process using an isotropic filter of 3×3 pixels may be repeated a plurality of times instead of using an isotropic filter of M×M pixels.

In the first and second embodiments, the case where the isotropic filter is used for the corner rounding process has been described, but another type of filter may be used.

In the embodiments described above, the case where the reference image is generated in the defect inspection apparatus has been described, but the method of generating the reference image is not limited to the defect inspection apparatus. The present invention may be applied to another apparatus that generates a reference image based on data, for example, a measurement apparatus or the like.

In the embodiments described above, machine learning or the like may be used for classification of corners. That is, the calculation conditions of the classification may be set by pattern learning using artificial intelligence (AI).

The present invention is not limited to the above-described embodiments, and can be modified in various manners in practice when implementing the invention without departing from the gist of the invention. Moreover, the embodiments can be suitably combined; in that case, the combined advantages are obtained. Furthermore, the above-described embodiments include various inventions, and a variety of inventions can be derived by suitably combining structural elements disclosed in connection with the embodiments. For example, if the object of the invention is achieved and the advantages of the invention are attained even after some of the structural elements disclosed in connection with the embodiments are deleted, the structure made up of the resultant structural elements can be extracted as an invention.

What is claimed is:

1. A defect inspection apparatus comprising:
   an imaging mechanism for imaging a sample;
   an image acquisition circuit configured to generate an inspection image based on image data of the sample imaged by the imaging mechanism;
   a development circuit configured to generate a developed image from design data;
   a reference image generation circuit that includes a corner rounding process circuit configured to detect corners of a pattern from the developed image, classify the detected corners into classes, and execute a corner rounding process with corner rounding amounts respectively different for the classes, and that is configured to generate a reference image using the developed image after the corner rounding process; and
   a comparison circuit configured to compare the inspection image with the reference image,
   wherein the corner rounding process circuit is configured to:
   execute a filtering process using an isotropic filter having a size equal to or smaller than a preset value based on a first corner rounding amount assigned to a first class;
   calculate a difference between the first corner rounding amount and a second corner rounding amount assigned to a second class; and
   execute the filtering process based on the difference, using the isotropic filter having the size equal to or smaller than the preset value.

2. The defect inspection apparatus according to claim 1, wherein the corner rounding process circuit is configured to set a corner detection pixel and at least a pixel adjacent to the corner detection pixel as a class region corresponding to a class of the corner detection pixel based on the pattern and shapes of the corners.

3. The defect inspection apparatus according to claim 2, wherein the corner rounding process circuit is configured to assign the corner rounding amount corresponding to the class of the corner detection pixel to the class region and create a corner rounding amount map.

4. The defect inspection apparatus according to claim 1, wherein the corner rounding process circuit is configured to:
   apply a label to a pixel corresponding to each pattern in the developed image; and
   execute the corner rounding process for each target label, while a pixel value of a non-target label is set to 0.

5. A defect inspection method comprising: imaging a sample to generate an inspection image;
generating a developed image from design data;
detecting corners of a pattern from the developed image;
classifying the detected corners into classes;
executing a corner rounding process with corner rounding amounts respectively different for the classified classes;
generating a reference image based on the developed image after the corner rounding process; and
comparing the inspection image with the reference image to perform inspection,
wherein the executing a corner rounding process includes:
executing a filtering process using an isotropic filter having a size equal to or smaller than a preset value based on a first corner rounding amount assigned to a first class;
calculating a difference between the first corner rounding amount and a second corner rounding amount assigned to a second class; and
executing the filtering process based on the difference, using the isotropic filter having the size equal to or smaller than the preset value.

6. The defect inspection method according to claim 5, further comprising setting a corner detection pixel and at least a pixel adjacent to the corner detection pixel as a class region corresponding to a class of the corner detection pixel based on the pattern and shapes of the corners.

7. The defect inspection method according to claim 6, wherein the executing the corner rounding process includes:
assigning the corner rounding amount corresponding to the class of the corner detection pixel to the class region;
creating a corner rounding amount map based on the corner rounding amount; and
executing the corner rounding process based on the corner rounding amount map.

8. The defect inspection method according to claim 5, further comprising applying a label to a pixel corresponding to each pattern in the developed image,
wherein the executing the corner rounding process is executed for each target label, while a pixel value of a non-target label is set to 0.

* * * * *